United States Patent
Cocchi et al.

(10) Patent No.: US 10,136,660 B2
(45) Date of Patent: Nov. 27, 2018

(54) METHOD FOR MAKING ICE CREAM

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 43 days.

(21) Appl. No.: 14/839,086

(22) Filed: Aug. 28, 2015

(65) Prior Publication Data
US 2016/0338377 A1 Nov. 24, 2016

(30) Foreign Application Priority Data
May 18, 2015 (IT) .................. 102015000015582

(51) Int. Cl.
*A23G 9/12* (2006.01)
*A23G 9/28* (2006.01)
(Continued)

(52) U.S. Cl.
CPC .............. *A23G 9/12* (2013.01); *A23G 9/08* (2013.01); *A23G 9/20* (2013.01); *A23G 9/228* (2013.01); *A23G 9/28* (2013.01); *A23G 9/305* (2013.01)

(58) Field of Classification Search
CPC .......... A23G 9/12; A23G 9/52; A23G 1/0009; A23G 9/305; A23G 9/04; A23G 9/08;
(Continued)

(56) References Cited

U.S. PATENT DOCUMENTS

| | | | | |
|---|---|---|---|---|
| 6,041,614 | A * | 3/2000 | Yamaya | A23G 9/12 165/61 |
| 6,948,327 | B2 * | 9/2005 | Bischel | A23G 9/08 62/196.4 |
| 2011/0271690 | A1* | 11/2011 | Cocchi | F25B 41/062 62/1 |

FOREIGN PATENT DOCUMENTS

| | | |
|---|---|---|
| EP | 2082649 A2 | 7/2009 |
| EP | 2491792 A1 | 8/2012 |

(Continued)

OTHER PUBLICATIONS

European Search Report dated Sep. 29, 2016 for counterpart EP App No. 16169554.9.
(Continued)

*Primary Examiner* — Hong T Yoo
(74) *Attorney, Agent, or Firm* — Shuttleworth & Ingersoll, PLC; Timothy J. Klima

(57) ABSTRACT

A method for making ice cream, including preparing a machine for mixing and cooling ice cream equipped: with a processing container defining a processing chamber and provided with a mixer rotating inside the processing chamber; and a thermal treatment plant, configured for being activated, selectively and alternatively, in heating or cooling mode, respectively, for heating and cooling the processing chamber. The method further includes: inserting inside the processing chamber a basic mixture; heating the basic mixture inside the processing chamber, so as to subject the basic mixture to a pasteurization treatment; cooling the basic mixture inside the processing chamber and, at the same time, rotating the rotary mixer, to incorporate air in the basic mixture and make ice cream; extracting the ice cream from the processing chamber.

7 Claims, 3 Drawing Sheets

(51) Int. Cl.
*A23G 9/08* (2006.01)
*A23G 9/22* (2006.01)
*A23G 9/30* (2006.01)
*A23G 9/20* (2006.01)

(58) Field of Classification Search
CPC . A23G 9/224; A23G 9/28; A23G 9/30; A23G 2200/12; A23G 9/20; A23G 9/40; A23G 9/225; A23G 9/282; A23G 1/46; A23G 3/46; A23G 1/56
See application file for complete search history.

(56) References Cited

FOREIGN PATENT DOCUMENTS

| | | |
|---|---|---|
| EP | 2578086 A1 | 4/2013 |
| EP | 2755496 A1 | 7/2014 |
| EP | 2856888 A1 | 4/2015 |
| GB | 623699 A | 5/1949 |
| JP | 2000093090 A | 4/2000 |
| WO | WO2013037882 A1 | 3/2013 |

OTHER PUBLICATIONS

W. S. Arbuckle, "Aging the Mix", Ice Cream, Fourth Edition, Jan. 1, 1986, The AVI Publishing Company, Westport, CT.

* cited by examiner

METHOD FOR MAKING ICE CREAM

This application claims priority to Italian Patent Application 102015000015582 filed May 18, 2015, the entirety of which is incorporated by reference herein.

BACKGROUND OF THE INVENTION

The present invention relates to a method for making ice cream.

As is known, in the food industry in question the safety and hygiene problems are particularly important.

More specifically, the presence of ubiquitous invasive infectious agents such as, for example, *Salmonella* and *Listeria monocytogenes*, are encountered with increasing frequency in the sector in question.

More specifically, the *Listeria monocytogenes* bacteria also proliferates in low temperature environments and with limited nutritional levels and it spreads rapidly by cross-contamination.

A typical example of this context is the process for producing ice cream and the machines used for processing ice cream.

It has also been found that each time the basic mixture is in contact with a few element (containers, accessories for picking up), there is an increase in the risk of contamination of the product which, in effect, reduces the overall food safety of the process for making the ice cream.

These facts have resulted in the need to increase the food safety in order to provide ice cream which is particularly safe, and which does not have any residual food risk for the consumers.

Elimination of the food risk, or at least its drastic reduction to levels which do not represent a problem for someone who eats the ice cream, is a need felt by all the individuals involved in the sector, starting from the manufacturers of semi-finished food items and machines for processing them up to ice-cream vendors.

In this context, it is therefore essential to increase the food safety of the processing for making ice cream and to provide an operating method which is inherently safe, that is, which allows the potential risks of contamination to be eliminated regardless of the factors external to the preparation performed on the machine for guaranteeing a safe end product.

SUMMARY OF THE INVENTION

The aim of this invention is to provide a method for making ice cream which allows the above-mentioned needs to be met.

The aim of this invention is also to provide a method for making ice cream which allows the potential risks of contamination of the product to be reduced without introducing further processing and, therefore, further operations on the food product and without extending the processing times.

Another aim of the invention is to provide a method for making ice cream which simplifies the operation, reducing the handling of the ingredients.

A further aim of this invention is to provide a method for making ice cream which can be performed in small spaces.

This aim is achieved by a method for making ice cream comprising technical features described herein.

BRIEF DESCRIPTION OF THE DRAWINGS

Technical features of the invention, with reference to the above aims, are clearly described below and its advantages are apparent from the detailed description which follows, with reference to the accompanying drawing which illustrates a non-limiting example embodiment of the invention and in which.

DESCRIPTION OF THE PREFERRED EMBODIMENTS

Figure 1:
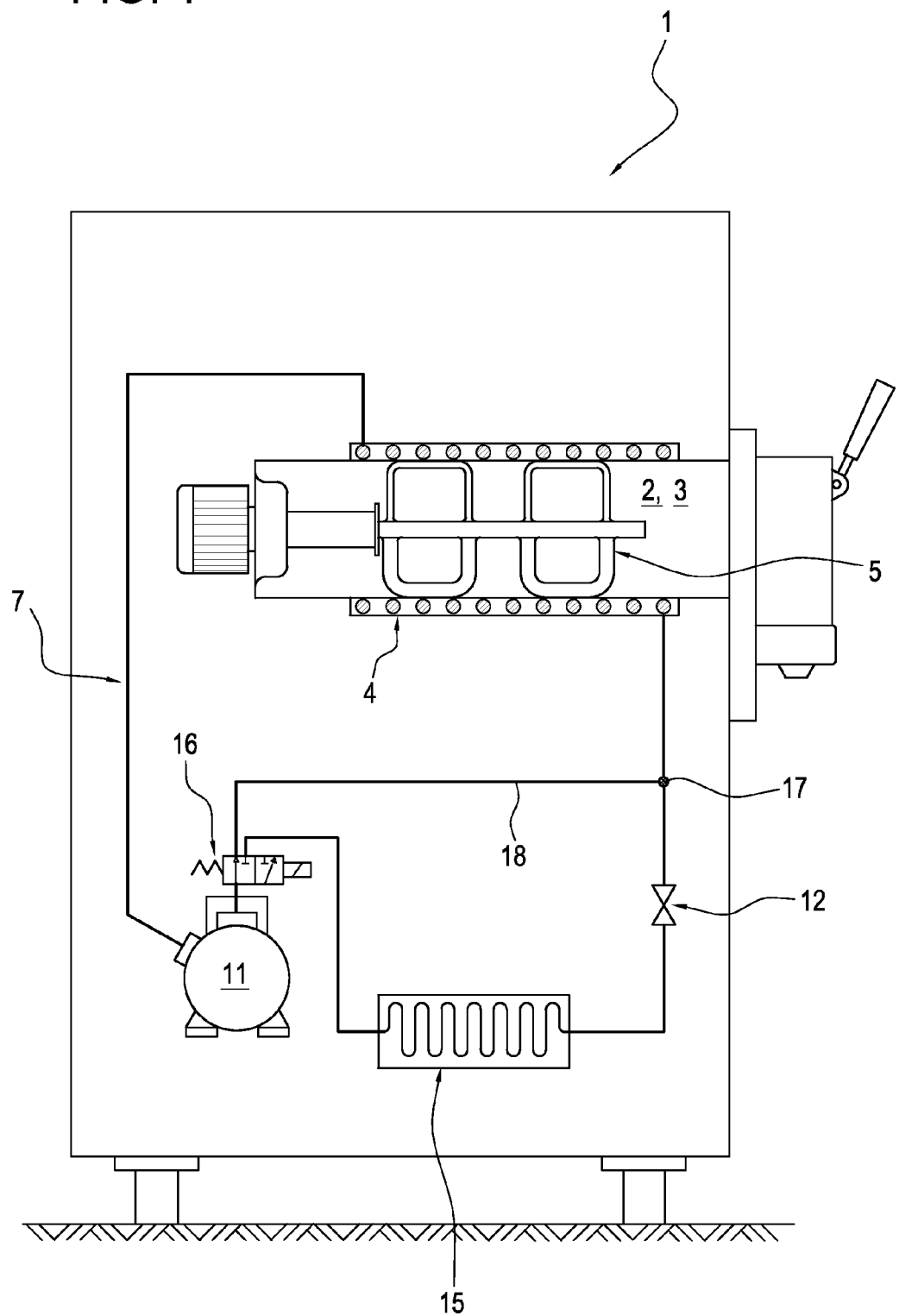
FIG. 1 is a schematic view of a first embodiment of a machine in which the method according to this invention is implemented.

With reference to the accompanying drawings, the numeral 1 denotes a machine for making ice cream, designed to make ice cream (preferably of the artisan type) with the method according to this invention.

In the context of the invention, the term "ice cream" is used to mean a food preparation based on sugars, milk and milk derivatives, and cream to which fruit, aromatic products or other ingredients are added to obtain different flavours.

The invention also relates to a method for making ice cream.

It should be noted that the processing method is a batch processing method.

The method comprises a step of preparing a machine 1 for the mixing and cooling of ice cream equipped with:
- a processing container 2 defining a processing chamber 3 and provided with a mixer 5 rotating inside the processing chamber 3;
- a thermal treatment plant, configured for being activated, selectively and alternatively, in heating or cooling mode, respectively, for heating and cooling the processing chamber 3.

Preferably, the thermal treatment plant is a thermodynamic plant, that is, a plant operating according to a thermodynamic cycle.

Again, preferably, the thermal treatment plant comprises a compressor.

Further, the thermal treatment plant comprises at least one heat exchanger, connected to the processing chamber 3.

Further, according to the invention, the method comprises the following steps:
- inserting inside the processing chamber 3 a basic mixture for ice cream;
- activating the thermal treatment plant in heating mode for a predetermined time for heating the basic mixture inside the processing chamber 3, such as to subject the basic mixture to a thermal treatment (of pasteurisation) inside the processing chamber 3 (so as to deactivate any infectious agents which may be present);
- activating the thermal treatment plant in cooling mode for cooling the basic mixture inside the processing chamber 3 and, at the same time, rotating the rotary mixer 5, so as to allow incorporation of air in the basic mixture and make an ice cream type product in the processing chamber 3;
- keeping the basic mixture previously subjected to the thermal treatment (of pasteurisation) inside the processing chamber 3 between the step of activating the thermal treatment plant in heating mode for a predetermined time and the step of activating the thermal treatment plant in cooling mode for cooling the basic mixture previously subjected to the thermal treatment (of pasteurisation) inside the processing chamber 3 and, at the same time, rotating the rotary mixer 5;

extracting at least one portion of the ice cream type product from the processing chamber 3.

It should be noted that the method comprises, according to the invention, making ice cream according to a "batch" process, that is, in batches: in effect, a predetermined quantity of basic mixture is inserted and it is totally transformed into ice cream (without, in the meanwhile, new basic ice cream being inserted).

Figure 3:
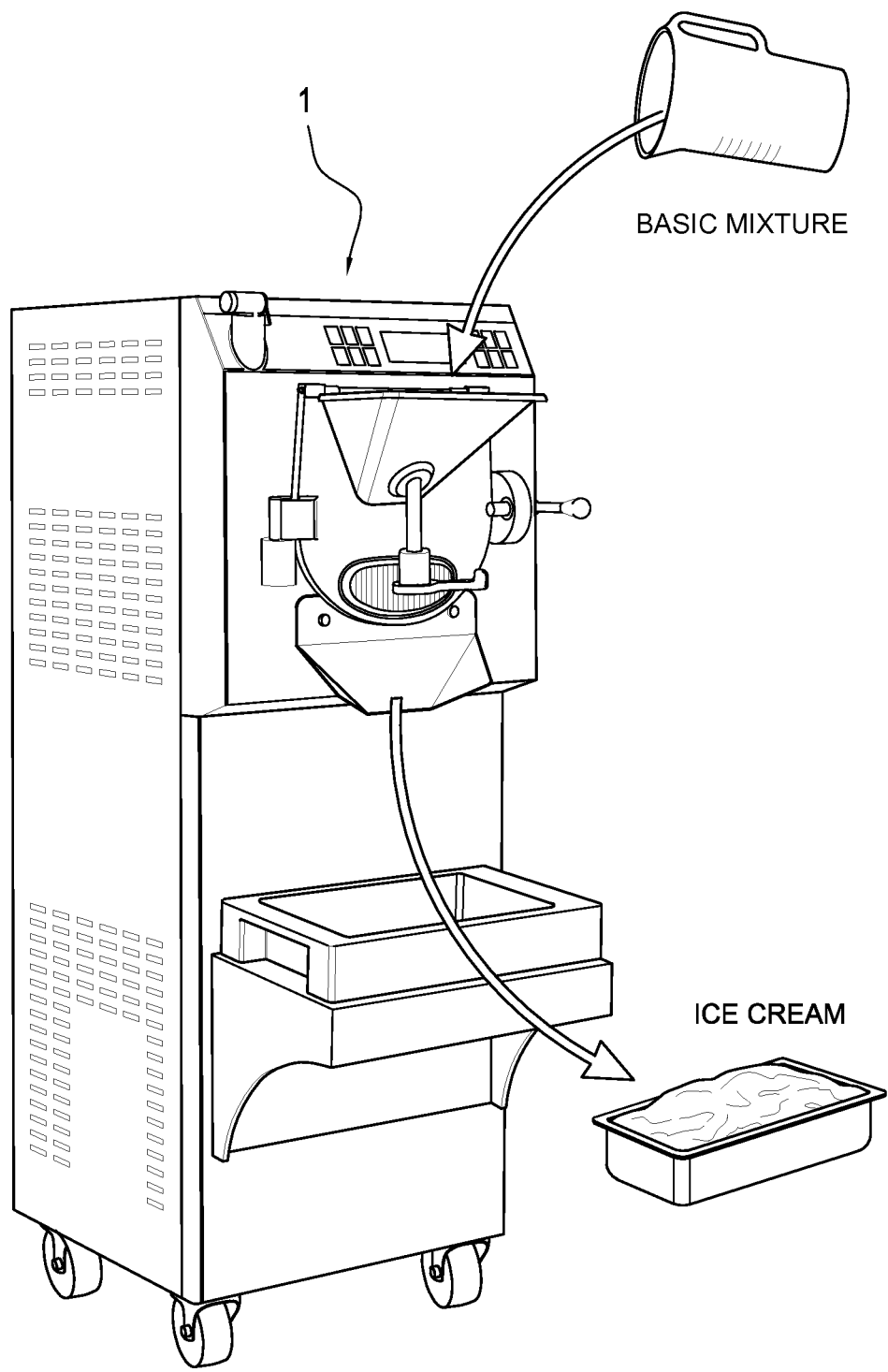
FIG. 3 schematically illustrates the making of ice cream in accordance with the method according to this invention.

Preferably, the machine 1 comprises a hopper for introducing the basic mixture (as illustrated in FIG. 3) in the processing chamber 3.

Preferably, the basic mixture comprises milk.

Preferably, the basic mixture also comprises sugar.

It should be noted that the mixing and cooling machine is a unit for the mixing and cooling in batches.

According to another aspect, the step of activating the thermal treatment plant in cooling mode for cooling the basic mixture inside the processing chamber 3 comprises a step of cooling the mixture to a temperature of between −15° C. and 0° C. (more preferably between −15° C. and −5° C., still more preferably between −12° C. and −7° C.).

It should be noted that in this way, according to the ranges of temperature previously indicated, an ice cream type product of excellent quality is made.

According to yet another aspect, the step of activating the thermal treatment plant in heating mode comprises a step of heating the basic mixture to a heating temperature of between 60° C. and 85° C.

Preferably, the heating temperature is between 70° C. and 85° C.

Still more preferably, the heating temperature is between 70° C. and 80° C.

According to another aspect, the heating temperature is preferably greater than to 75° C. (and preferably less than 100° C.).

It should be noted, more generally, that the temperature is selected so as to allow the elimination of the above-mentioned *Listeria monocytogenes* bacteria.

According to a yet further aspect, the method comprises, between the above-mentioned step of activating the thermal treatment plant in heating mode and the above-mentioned step of activating the thermal treatment plant in cooling mode, a further step of activating the thermal plant in cooling mode for a predetermined maintaining time for maintaining the basic mixture at a temperature of between 2° C. and 6° C., for the predetermined maintaining time.

It should be noted that this further step basically has the aim of allowing the preservation, in safety, of the pasteurised mixture before the mixing and cooling.

It should be noted that, advantageously, the method according to the invention allows the food safety to be increased and the potential sources of contact with the product being processed to be reduced.

In effect, starting from the moment in which the basic mixture is introduced into the processing chamber 3, the product (semi-finished product) is kept inside the processing chamber 3 until it is extracted; after the mixing and cooling of the basic mixture the finished product is removed directly.

For this reason, the product (semi-finished product) does not come into contact with further elements or accessories (nor handled by the retailer) during the entire processing, remaining confined in the processing chamber 3 which is a closed and safe environment from a food product point of view.

In this way, the handling of the basic mixture is avoided and it is kept inside the hygienically safe environment of the processing chamber 3.

Thus, the food risks are reduced considerably.

It should also be noted that, according to the method, it is possible to make a product of the ice cream type using a single machine 1: in effect, both the pasteurising and the mixing and cooling are performed in the machine 1, inside the same container 3.

It should therefore be noted that the method, according to the invention, increases the food safety of the product, by reducing possible contamination during processing.

In this way, advantageously, the machine 1 may be particularly compact, and the method for making ice cream can be performed, advantageously, also in facilities provided with a small plan space.

According to one aspect, the thermal treatment plant is a plant operating according to a thermodynamic cycle and comprises a circulation circuit provided with an operating fluid (heat carrier fluid).

According to another aspect, the thermal treatment plant comprises a single compressor.

With reference to the embodiment of FIG. 1, the thermal treatment plant is configured to perform, when activated in heating mode, a hot gas thermal cycle.

The heat treatment plant of FIG. 1 is described in more detail below.

The fluid circulation circuit 7 comprises a compressor 11, a first heat exchanger 4, a second heat exchanger 15, and a throttling valve 12, operating according to a thermodynamic cycle. More precisely, the second heat exchanger 15 leads to the delivery terminal of the compressor 11 and is connected to the first heat exchanger 8 through the throttling valve 12.

The first heat exchanger 4 is associated with the processing chamber 3.

More specifically, the first heat exchanger 4 is defined by a coil wound around the side walls of the respective processing chamber 3 to exchange heat with the product contained therein.

The fluid circulation circuit 7 further comprises a switching valve 16 which is located downstream of the delivery terminal of the compressor 11 and whose output is connected both to the second heat exchanger 15, at a first switching position of it, and to a node 17 interposed between the throttling valve 12 and the first heat exchanger 8, at a second switching position of it.

The connection between the switching valve 16 and the node 17 is made by a by-pass branch 18.

The switching valve 16 can be controlled by the operator for changing the configuration of the circuit 7.

Operatively, if the switching valve 16 is in its first position, where the by-pass branch 18 is closed and the connection between the compressor 11 and the second heat exchanger 15 is open, the operating mode of the single fluid circulation circuit 7 is the one whereby the first heat exchanger 4 acts as an evaporator and the second heat exchanger 15 acts as a condenser.

The product in the processing chamber 3 is cooled: the step of activating the thermal treatment plant in cooling mode for cooling the basic mixture previously subjected to the thermal treatment (of pasteurisation) inside the processing chamber 3 is activated and, at the same time, the rotation of the rotary mixer 5 is activated, so as to allow the incorporation of air in the basic mixture and make an ice cream type product in the processing chamber 3.

On the other hand, if the switching valve 16 is in its second position, where the by-pass branch 18 is open and the connection between the compressor 11 and the second heat exchanger 15 is closed, the operating mode of the single fluid circulation circuit 7 is the one whereby the throttling valve 12 and the second heat exchanger 15 are cut off from fluid circulation, while the first heat exchanger 8 has fluid flowing through it and transfers heat to the respective tank 3, thereby heating the product contained therein.

In this case, the fluid circulating in the circuit 7 is heated at the compressor 11, where heat is generated by the very effect of its operation (heat generated by friction between the parts of the compressor 11 and by the Joule effect in the electric motor of the compressor 11 itself) and transfers heat to the product in the tank 3 associated with the first heat exchanger 8 which has fluid flowing through it.

The basic mixture is heated in the container 3: thus, the thermal treatment plant is activated in heating mode for a predetermined time for heating the basic mixture inside the processing chamber 3, such as to subject the basic mixture to a thermal treatment (of pasteurisation) inside the processing chamber 3.

Figure 2:
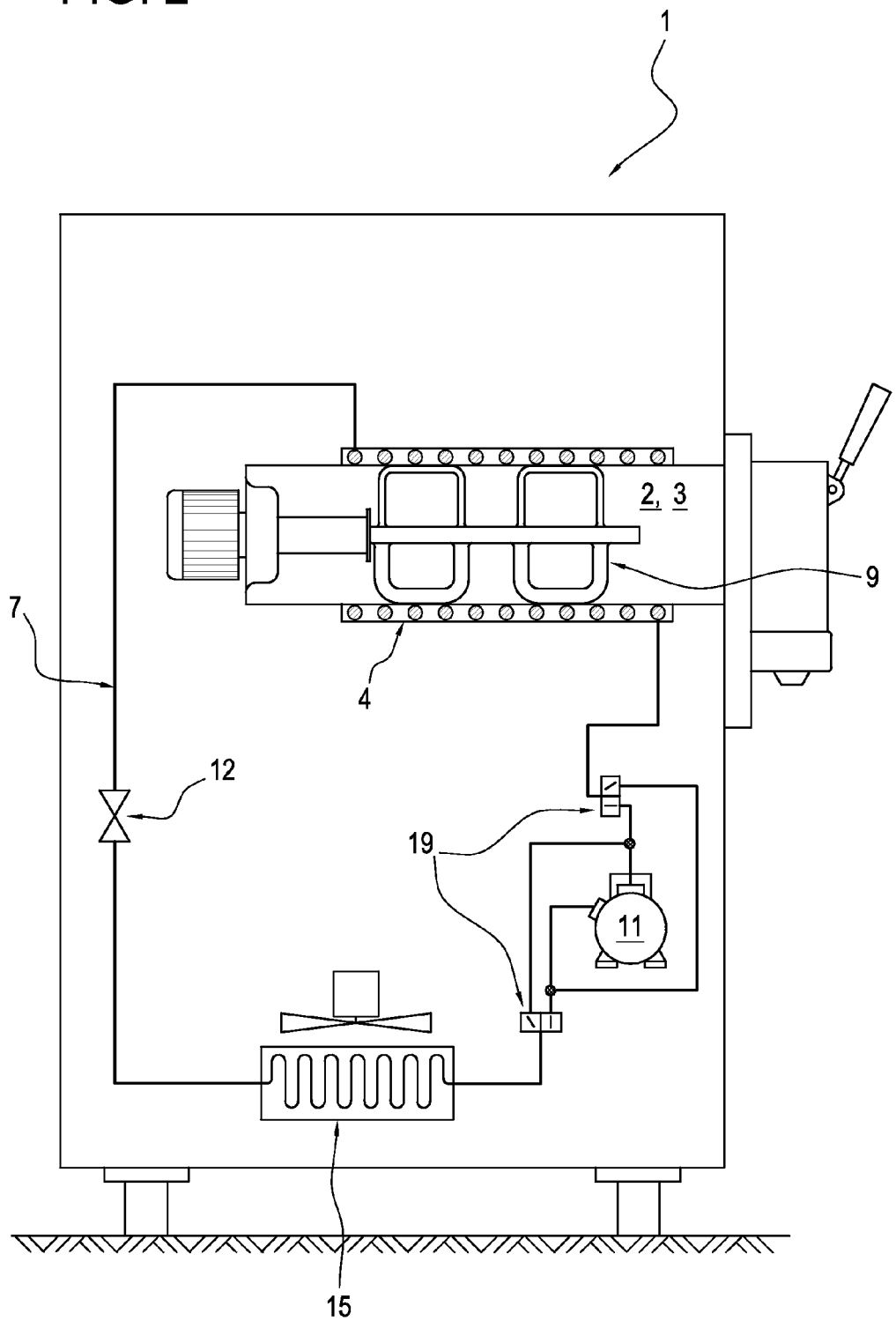
FIG. 2 is a schematic view of a second embodiment of a machine in which the method according to this invention is implemented.

With reference to FIG. 2, the circuit 7 for circulation of the operating fluid comprises a compressor 11, a first heat exchanger 4, a second heat exchanger 15, and a throttling valve 12, operating according to a thermodynamic cycle, and the fluid circulation circuit 7 further comprises a valve 19 for inversion of the thermodynamic cycle adjustable between a first configuration, in which the first heat exchanger 4 acts as an evaporator and the second heat exchanger 15 acts as a condenser, and a second configuration, in which the first heat exchanger 4 acts as a condenser and the second heat exchanger 15 acts as an evaporator, and wherein the step of activating the thermal treatment plant in cooling mode comprises a step of adjusting the valve 19 for inversion of thermodynamic cycle in the first configuration and the step of activating the thermal treatment plant in heating mode comprises a step of adjusting the valve 19 for inversion of the thermodynamic cycle in the second configuration.

In other words, the operating fluid circulating circuit 7 can operate, in cooling mode (cooling of the heat exchanger 4) or heat pump mode (heating of the heat exchanger 4) according to the step to be performed.

It should be noted that—according to both the embodiment of FIG. 1 and according the embodiment of FIG. 2—advantageously, there is a single thermal treatment plant, which considerably simplifies the machine 1.

What is claimed is:

1. A method for making ice cream, comprising:
    providing a machine for mixing and cooling of ice cream equipped with:
        a processing container defining a processing chamber and including a rotary mixer rotating inside the processing chamber;
        a thermal treatment plant, configured for being activated, selectively and alternatively, in a heating mode or a cooling mode, respectively, for heating and cooling the processing chamber;
    providing the thermal treatment plant is a plant operates according to a thermodynamic cycle and comprises a circuit with an operating fluid;
    providing the circuit for a circulation of the operating fluid comprises a compressor, a first heat exchanger, a second heat exchanger, and a throttling valve;
    operating the thermodynamic cycle, wherein the circuit further comprises an inversion valve for adjusting of the thermodynamic cycle between a first configuration corresponding to the cooling mode of the thermal treatment plant, wherein the first heat exchanger acts as an evaporator and the second heat exchanger acts as a condenser,
    and a second configuration corresponding to the heating mode of the thermal treatment plant, wherein the first heat exchanger acts as a condenser and the second heat exchanger acts as an evaporator;
    inserting a basic mixture for ice cream inside the processing chamber
    adjusting the inversion valve to the second configuration;
    while the inversion valve is in the second configuration, heating the basic mixture inside the processing chamber to subject the basic mixture to a thermal treatment inside the processing chamber to deactivate any infectious agents;
    adjusting the inversion valve to the first configuration;
    while the inversion valve is in the first configuration, keeping inside the processing chamber the basic mixture and maintaining the basic mixture at a temperature of between 2° C. and 6° C. for a predetermined maintaining time of greater than two hours;
    while the inversion valve is in the first configuration, cooling the basic mixture previously subjected to the thermal treatment inside the processing chamber and, at the same time, rotating the rotary mixer, so as to allow incorporation of air in the basic mixture and make an ice cream product in the processing chamber;
    extracting at least one portion of the ice cream product from the processing chamber to obtain the ice cream.

2. The method according to claim 1, wherein the heating the basic mixture inside the processing chamber is a pasteurizing thermal treatment.

3. The method according to claim 2, wherein the cooling the basic mixture inside the processing chamber comprises cooling the basic mixture to a temperature of between −15° C. and 0° C.

4. The method according to claim 2, wherein the cooling the basic mixture inside the processing chamber comprises cooling the mixture to a temperature of between −15° C. and −5° C.

5. The method according to claim 1, wherein the heating the basic mixture inside the processing chamber comprises heating the basic mixture to a temperature of between 60° C. and 85° C.

6. The method according to claim 1, wherein the thermal treatment plant comprises a single compressor.

7. The method according to claim 1, wherein the thermal treatment plant is configured to perform, while the inversion valve is in the second configuration, a hot gas thermal cycle.

* * * * *